Feb. 14, 1967  G. S. BOWMAN  3,304,420
APPARATUS FOR CHECKING INTEGRITY OF BRAKE PIPE OF FLUID
PRESSURE BRAKE SYSTEM AND PRECONDITIONING BRAKE
SYSTEM FOR AUTOMATED CONTROL
Original Filed Sept. 29, 1964   2 Sheets-Sheet 1
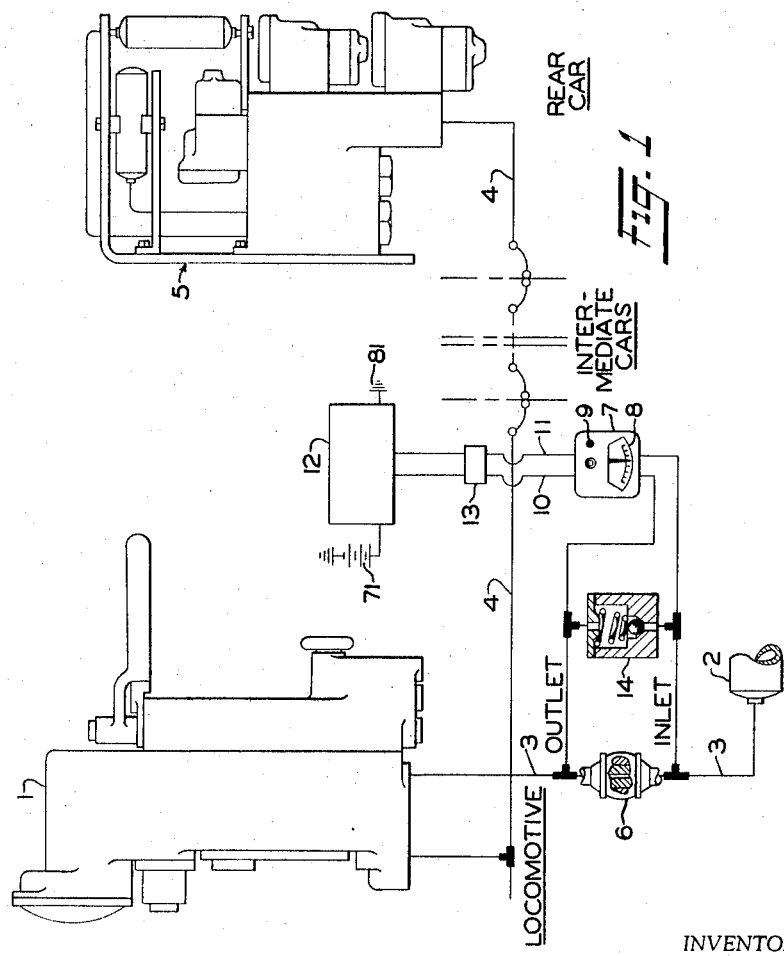
INVENTOR.
GEORGE S. BOWMAN
BY
A. A. Steinmiller
ATTORNEY

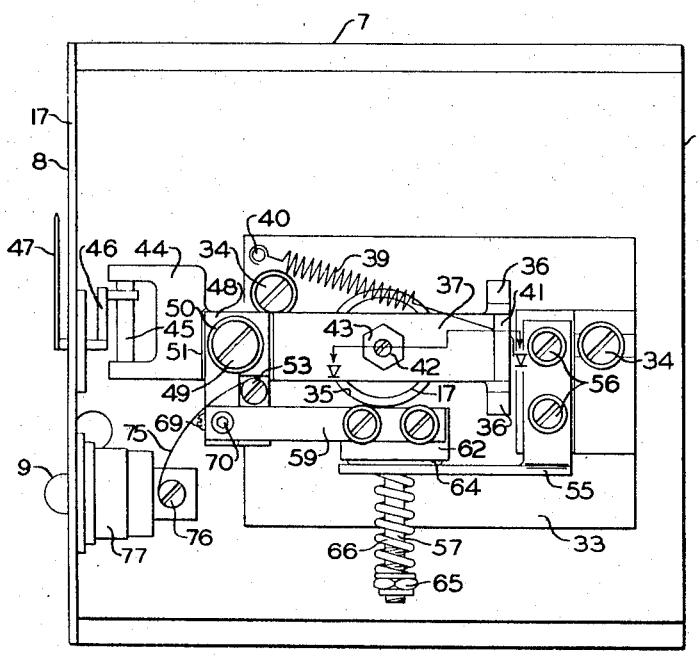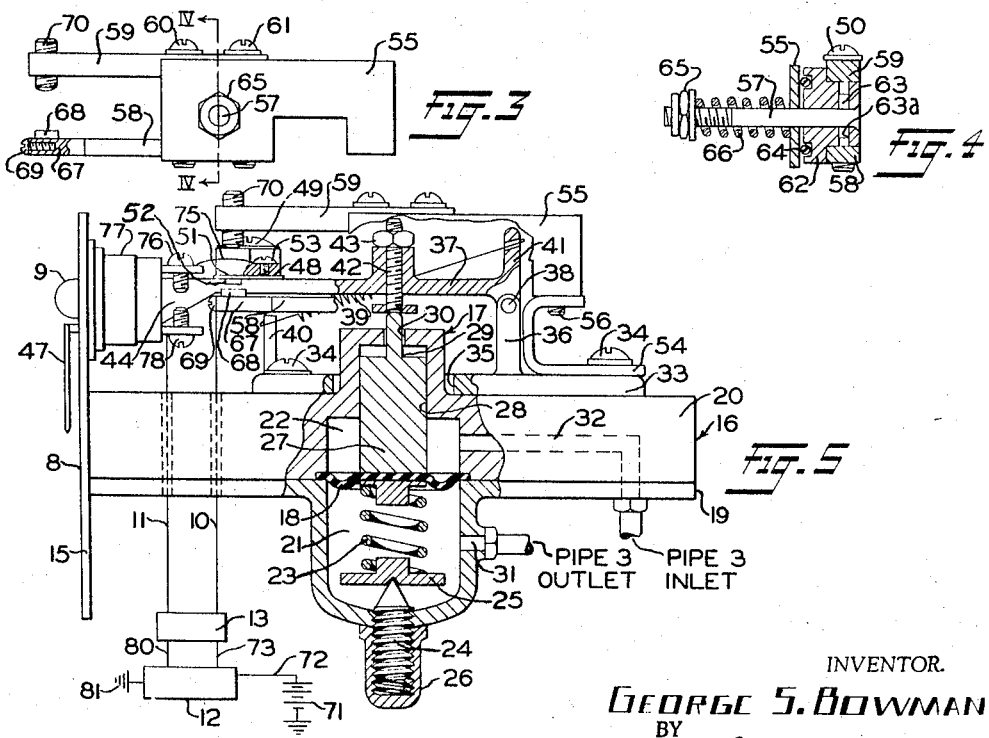

United States Patent Office 3,304,420
Patented Feb. 14, 1967

3,304,420
APPARATUS FOR CHECKING INTEGRITY OF BRAKE PIPE OF FLUID PRESSURE BRAKE SYSTEM AND PRECONDITIONING BRAKE SYSTEM FOR AUTOMATED CONTROL
George S. Bowman, 224 Elmore Road, Pittsburgh, Pa. 15221
Original application Sept. 29, 1964, Ser. No. 400,049. Divided and this application June 10, 1966, Ser. No. 556,728
2 Claims. (Cl. 246—169)

This application is a division of copending application Serial No. 400,049 filed September 29, 1964. The invention relates to a signal apparatus and a switch means therefor, and, more particularly, to a switch means utilized in a fluid flow indicator device as employed to signal the rate of flow of fluid in a brake pipe on a train utilizing automatic brake control equipment.

In present-day railway equipments, there is usually provided a device known as a "brake pipe flow indicator" connected in parallel across a choke in the supply pipe from the main reservoir to the automatic brake valve to indicate the rate of flow of fluid from the main reservoir to the brake pipe via the automatic brake valve, incident to charging the brake pipe. A loaded by-pass valve is also connected in parallel with the choke to insure rapid charging flow therethrough when necessary for charging the brake pipe during brake release operations. The flow indicator utilized in present-day equipments is operable responsively to a pressure differential established across the parallel-connected choke and by-pass valve in the supply pipe to actuate a pressure responsive diaphragm therein to cause an indicating needle to move across a dial to indicate the rate of flow of fluid under pressure to the brake pipe and also to cause closure of a switch mechanism when a preselected set rate of flow above leakage flow is reached, to energize a signal light, and to cause opening of said switch mechanism when the rate of charging flow reduces below the preselected rate to extinguish the signal light and thereby indicate that the brake pipe is fully charged.

In more recent railway equipments and especially automatic brake control equipments for unmanned trains, a brake pipe integrity checking apparatus has been developed to operate from the rear of the train to indicate brake pipe integrity resultant from the fact that the brake pipe attains substantial full charge. A brake pipe integrity checking apparatus of this type is shown and described in Patent 3,175,389 issued March 30, 1965 of Worbois and Jeffrey and assigned to the assignee of the present application.

In use, when the brake pipe is substantially fully charged, the brake pipe integrity checking apparatus operates to effect a brake pipe reduction at a service rate, said reduction being indicated on a flow indicator on the locomotive. When the flow indicator shows the aforedescribed service reduction, it also operates switching mechanisms to cause the automatic brake control equipments to initiate a brake release to recharge the brake pipe after the service reduction to complete full charge and then render automatic propulsion equipment effective to start the train in operation. On long trains or trains with high brake pipe leakage, complete recharge of the brake pipe would be very lengthy in time, and although it would be safe to place the automatic equipment in control of the train to proceed in operation, the switch mechanisms of the brake pipe flow indicator would not indicate such until the brake pipe was completely recharged.

It is an object of the present invention to provide a signal and switch means to be utilized with a brake pipe flow indicator in an automatic train brake and propulsion control equipment to give an indication of the rate of charging of the train brake pipe, signal when said brake pipe is charged sufficiently to proceed safely without waiting for complete recharge, and render the automatic equipment operable to proceed with a minimum of time delay.

According to the present invention, there is provided a new and novel signal and switch means for a flow indicator as utilized with a brake pipe integrity checking apparatus on automatic train control equipment. The signal and switch means includes a contact-carrying lever attached to the diaphragm piston following arm of the flow indicator, with a movable contact arm and a follower arm positioned about said lever. With charging of the brake pipe and resultant flow of fluid therein, the diaphragm piston follower arm is positioned to cause the attached contact-carrying lever to move into circuit making engagement with the movable contact arm and rotate said contact arm in one direction about a mounting bracket until the point of maximum rate of flow is attained and as long as the rate of flow does not decrease. The follower arm simultaneously follows at a preregulated distance behind the movement of the contact arm. As the rate of flow decreases, the contact-carrying lever arm attached to the diaphragm piston following arm moves away from the contact arm into engagement with the follower arm to rotate the follower arm and contact arm in a reverse direction about the mounting bracket as long as the rate of flow decreases. Should the rate of flow increase, as would result from a service reduction being effected by the brake pipe integrity apparatus, the contact lever reverses direction of movement to again immediately move into circuit making engagement with the contact arm. While the lever arm engages the contact arm, the circuitry completed thereby operates indicating signals and train controls to effect automatic control of the train without waiting for complete recharge of the brake pipe.

In the accompanying drawings:

FIG. 1 is a schematic illustration, partly in section, of the train brake equipment showing the brake pipe flow indicator as positioned on the train relative to the brake valve on the head end and a brake pipe integrity signaling apparatus on the rear end of the train;

FIG. 2 is a plan view showing an embodiment of a brake pipe flow indicator constructed and arranged to operate a switch means according to the invention;

FIG. 3 is a view showing separately certain details of the novel switch means only;

FIG. 4 is a sectional view of the switch means, taken on line IV—IV of FIG. 3, and FIG. 5 is an elevational view, partly in section, of the brake pipe flow indicator showing further structural and operational details of the brake pipe flow indicator with a fragmental section of FIG. 2 taken along line V—V.

DESCRIPTION—FIG. 1

Referring to FIG. 1, the apparatus includes a brake valve 1 on the locomotive of the train for controlling the supply of fluid under pressure from a main reservoir 2 and a supply pipe 3 to a brake pipe 4 extending throughout the entire train to operate braking equipment (not shown). An integrity signal transmitter device 5 is connected to the brake pipe on the rear car of the train. A choke 6 is inserted in the supply line with a brake pipe flow indicator 7 connected in parallel therewith. The flow indicator 7 indicates, by movement of a needle on a dial 8, the rate of flow across the choke 6, and an internal switch mechanism, described hereinafter, effects illumination of a dial indicator light 9 and energizes circuitry including wires 10 and 11 to control automatic brake and propulsion control equipment, shown herein as control box 12 with a parallel timing means 13. A by-pass valve 14 is also connected in parallel with the choke 6 and the flow indicator 7 for bypassing the choke 6 during rapid recharge of the brake pipe incident to a brake release in a well-known manner. With such rapid recharge and the by-pass valve 14 opened, the flow indicator 7 will indicate the flow rate in the same manner as with it closed, as there is sufficient pressure differential on opposite sides of said by-pass valve 14 to cause an accurate flow indication.

Referring to FIGS. 2 and 5, the flow indicator 7 is constructed with a dial face 15 mounted on a base piece 16, with a diaphragm piston means 17 formed in said base piece 16. The diaphragm piston means 17 is formed with a diaphragm 18 suitably mounted between two halves 19 and 20 of said base piece 16, with a spring chamber 21 formed on one side (lower) of the diaphragm in the half 19 and a piston chamber 22 formed on the other side (upper) of the diaphragm in the half 20. The spring chamber 21 houses an adjusting spring 23 suitably positioned to bias the diaphragm 18 upward to a neutral position, as shown, said spring having a pressure regulating means comprising a set screw 24 adjustable against a plate 25 at the outer end of the spring. The set screw 24 is suitably covered by a cap 26 to prevent accidental readjustment. The piston chamber 22 houses a piston 27 suitably connected at one end to the diaphragm 18 by means (not shown), the other end being slidably positioned in a bore 28 formed in the base piece half 20. A plunger 29 formed on the outer end of the piston 27 projects through a port 30 in the half 20 to operate the switch mechanism, in a manner hereinafter described.

The spring chamber 21 has a passage 31 through the base half 19 which is suitably adapted to be connected by piping to the outlet side of the choke 6 in supply pipe 3 leading to the brake valve, while piston chamber 22 has a passage 32 through the base half 20 which is suitably adapted to be connected by piping to the inlet side of the choke 6 in supply pipe 3 leading from the main reservoir 2. It can thus be seen that fluid pressure in the piston chamber 22 is always the same as that in the main reservoir, while the fluid pressure in the spring chamber 21 is the same as that in the brake pipe during charging of the brake pipe. Therefore, the diaphragm 18 and piston 27 are moved downwardly toward the spring chamber during charging or brake release at an amount according to the rate of charge of the brake pipe. The greater the rate of charge in the brake pipe, the greater the downward movement of the diaphragm 18, piston 27 and plunger 29, and, consequently, the greater the movement of the switch mechanism, as hereinafter explained.

A mounting plate 3 is suitably attached to the top half 20 of the base piece 16 by screws 34. An opening 35 is formed in the mounting plate 33 to accommodate the upwardly extending piston chamber portion of the diaphragm piston means 17. The mounting plate 33 has two upwardly extending arms to form a yoke 36 between which a lever arm 37 is pivotally mounted by a pivot pin 38. The pivot mounting of the lever arm 37 is located near the so-called "back" of the indicator, in a manner to extend toward the so-called "front" out over the plunger 29 which protrudes upwardly from the diaphragm piston means 17. A spring 39 is attached between a peg 40 on the mounting plate 33 and an upwardly extending flange 41 on the lever arm near the pivot mounting, in a manner to bias the outwardly extending lever arm about the pivot pin 38 in a downward direction to engage the plunger 29. An adjustable engaging screw 42 is threaded into the lever arm 37 at the point of engagement with the plunger 29, such that the degree of downward pivotal movement of said lever arm can be regulated and then locked by a lock nut 43 on said engaging screw 42. A yoke 44 is formed on the outer end of the lever arm 37 (the end away from the pivot mounting) at the rear of the dial face 15. A pin 45 extends across the yoke 44 and engages a crank lever 46 on a shaft which extends through the dial face 15 to a centrally located dial indicator 47, in a manner that movement of the lever arm 37 about the pivot pin 38 is transmitted to the dial indicator 47, which is rotatably positioned across the dial 8 to indicate the degree of movement of the lever arm, which, in turn, is dependent on the rate of brake pipe flow, as explained hereinafter.

A contact arm 48 of electrical conducting material is secured to the lever arm 37 near the outer end thereof by a screw 49, in a manner to extend perpendicular therefrom in the same plane. The contact arm 48 is electrically insulated from the lever arm 37 by an insulating washer 50 at the screw 49 and a suitable insulating plate 51 under the arm. A raised contact button 52 is located at the outer end of the contact arm 48 and electrically connected through the contact arm to a terminal screw 53.

A U-shaped mounting bracket 54 is secured to the mounting plate 33 by the screw 34 at the so-called "back" thereof, behind the yoke 36. A vertical plate 55 is secured to the mounting bracket 54 by screws 56. Secured to the vertical plate 55 by a bolt 57 is a switch assembly comprising a contact arm 58 and a follower arm 59 made of rigid non-conducting material, each secured by bolts 60 and 61 to an insulated friction block 62 which is secured to the vertical plate by the bolt 57. A rubber O-ring 64 is positioned in a groove in the friction block 62 to provide a friction fit between said block 62 and the plate 55. A pin 63 is inserted in a drilled hole 63a through the friction block 62 and the bolt 57 to prevent the bolt 57 from rotating within the block 62 and causing the bolt to turn with the friction block 62 when said block is rotated with the bolt 57 as an axis. The degree of aforesaid friction can be regulated by adjustment of an adjusting nut 65 on the bolt 57 extending through the vertical plate 55 and the block 62. Positioning the adjusting nut 65 regulates the biasing pressures of a spring 66 encircling the bolt 57 between the nut and the vertical plate 55 to thereby regulate the amount of friction forces acting between the vertical plate 55 and the O-ring 64 in the friction block 62.

The contact arm 58 is made of non-conducting material and has at the outer end a contacting fitting 67 of conducting material comprising a contact button 68 and a terminal screw 69 connected electrically thereto. The follower arm 59 is made of non-conducting material and has an adjusting screw 70 at the outer end thereof to adjust the engageable distance by which the follower arm 59 is from the contact arm 48 on the lever arm 37 when the contact arm 48 engages the contact fitting 67 on the contact arm 58, in a manner described hereinafter.

*Operation*

In operation, this equipment operates similarly to that described in the hereinbefore-mentioned copending application. The normal charging of the brake pipe to compensate for brake pipe leakage is indicated as a very slow rate of charge on the flow indicator by measuring of the pressure differential across the choke 6 in the usual well-known manner. When a train equipped with automatic brake and propulsion control is shifted from manual operation to automatic operation, it is necessary to bring the train to a standstill and then effect an emergency brake application manually by use of the brake valve 1, then recharge the brake pipe to a degree where the transmitter device 5 causes a service reduction of brake pipe pressure, following which the brake pipe is recharged via the brake valve on the locomotive, before the automatic equipment can be conditioned for automatic operation. This operation, described in the aforementioned patent, is briefly referred to hereinafter to explain the operation of the present invention.

It should be noted that the flow indicator of the present application is connected into the supply pipe of the accompanying equipment and not in the brake pipe, as is done in the equipment of the mentioned copending application; however, the operation of the flow indicator and accompanying equipment is not changed by such relocation, but is merely a matter of choice.

During charging of the brake pipe 4 after the aforesaid emergency application, fluid under pressure flows from the main reservoir 2 via supply pipe 3 and the choke 6, parallel by-pass valve 14 (open during recharge after emergency), and parallel flow indicator 7 to the brake valve 1, and thence therethrough to the brake pipe 4 throughout the train. The transmitter device 5 on the rear car is simultaneously charged as long as the integrity of the brake pipe throughout the train is unimpaired. The flow indicator 7 on the locomotive will indicate, by movement of a needle on the dial 8, the rate of flow of fluid under pressure to the brake pipe, in a manner described hereinafter, said rate being initially high (the pressure differential being measured across the open bypass valve 14) and becoming lesser in degree as the brake pipe approaches a state of being fully charged (the pressure differential at this time being measured across the choke 6 as the bypass valve 14 closes at reduced rates). As the brake pipe approaches the state of being fully charged, a condition that can only result if the integrity of the brake pipe is unimpaired, the transmitting device 5 on the rear car operates in a manner to effect a brake pipe blow down at a rate determined by said transmitting device to be similar to a service rate reduction of brake pipe pressure. An understanding of the operation of the transmitting device 5 to effect this reduction is not necessary to an understanding of the present invention, but may be obtained, if desired, from the mentioned patent. This just-mentioned service reduction of fluid pressure is readily indicated on the dial 8 of the flowmeter due to the resultant sudden increase in rate of flow of the fluid under pressure charging on the locomotive. On the standard flow indicator in common usage, the switch mechanism thereon is normally merely an on-and-off mechanism that is "on" when the brake pipe is charging above a certain rate exceeding that necessary to compensate for leakage and is "off" when the brake pipe is fully charged or being charged at a very low rate merely to compensate for leakage; therefore, no change in the dial indicator light 9 or possible change in electrical circuitry would be effected by the switch mechanism due to the aforementioned service reduction effected by transmitting device 5 prior to complete and full recharge.

In the new and novel switch mechanism utilized in the present invention, the service reduction prior to full recharge effects a series of switch mechanism operations now described in conjunction with FIGS. 2, 3, 4 and 5.

During recharge of the brake pipe, after the aforesaid emergency reduction, fluid flowing from the main reservoir 2 through the choke 6 and by-pass valve 14 creates a pressure differential across the flow indicator, whereby the fluid pressure in the inlet side of pipe 3 is greater than the fluid pressure in the outlet side of pipe 3. With the fluid pressure in the pipe 3 inlet side of the flow indicator greater than that in the pipe 3 outlet side, the fluid under pressure in the passage 32 and piston chamber 22 is greater than that in the passage 31 and the spring chamber 21, thereby causing the diaphragm 18, piston 27 and plunger 29 all to move downwardly against the force of the spring 23. As the plunger 29 moves downward, the spring 39 will cause the lever arm 37 to also move downward about the pin 38, such that the engaging screw 42 is maintained in engagement with the plunger 29. With the downward movement of the lever arm 37, the pin 45 at the outer end thereof engages and moves the crank lever 46 to cause the dial needle or indicator 47 to position on the dial 8, in a manner to indicate the rate of flow of brake pipe recharge in accordance with the degree of downward movement of the lever arm 37, greater movement indicating greater flow. Simultaneously, the downward movement of the lever arm 37 causes the attached contact arm 48 to move downward such that the contact button 52 thereon engages the contact button 68 on the contact arm 58. Further downward movement of the lever arm 37 will cause the switch assembly, including the contact arm 58 and follower arm 59, to rotate about the bolt 57 with a relative degree of free movement as determined by the friction forces attained by the O-ring 64 engaging the vertical plate 55 during aforesaid rotating movement.

With the contact button 52 engaging the contact button 68, circuitry is completed from a battery source 71 via a wire 72 to the automatic control box 12 and thence by wire 73 to the timing means 13, and thence by wire 10 to terminal screw 69 on the contact arm 58, and by contact button 68 on the contact fitting 67 to the engaging contact button 52 on the contact arm 48, to the terminal screw 53, and then by way of wire 75 to a terminal screw 76 on the base socket 77 of the dial indicating light 9, through the dial indicating light 9 to the terminal screw 78 thereof, and wire 11 to the timing means 13, and wire 80 to the automatic control box 12 and ground connection 81. Completion of this just-described circuitry, after the emergency reduction, causes the dial indicating light 9 to be illuminated, and also energizes the timing means 13 to begin a timing operation (an understanding of which is not necessary to an understanding of the present invention), which, after a predetermined length of time sufficient to allow normal recharge of the brake pipe, will condition the automatic control box 12 for automatic operation once the aforesaid circuitry is energized. An understanding of the operation of the automatic controls within the control box 12 is not necessary to an understanding of the present invention, and is, therefore, not described herein.

During this recharge of the brake pipe after emergency, the pressure differential between the outlet and inlet to the flow indicator slowly decreases, thereby permitting the spring 23 in the spring chamber 21 thereof to move the diaphragm 18, piston 27, and plunger 29 upward against the engaging screw 42 to move the lever arm 37 upward to disengage the contact buttons 68 and 52 and interrupt the aforedescribed circuitry. Interruption of the described circuitry extinguishes the dial indicating light 9; however, the timing device 13 continues to operate to prepare the automatic control box 12 for operation once the circuitry is again completed.

The plunger 29 continues to move upward as the brake pipe becomes more fully charged, thereby moving the lever arm 37 upward into engagement with the adjusting screw 70 on the follower arm 59 and thereby rotating the whole switch assembly about the bolt 57 in an upward motion. In that the contact arm 58 is part of the switch assembly, including the follower arm 59, the contact arm 58 will also move upward in a follower motion with upward motion of the follower arm 59, as just described.

It can thus be seen that with the contact arm 58 following close behind the upward movement of the lever arm 37 and follower arm 59, that when the brake pipe approaches a condition of near full charge and the transmitting device 5 initiates the aforedescribed service reduction (indicating that the train is safe to proceed), the increase in charging rate resulting therefrom will cause the lever arm 37 to move downward and immediately engage the following contact arm 58 to thereby reenergize the circuitry described hereinbefore. With this second energization of the described circuitry, the dial indicating light 9 is again illuminated and the timing device 13 is rendered effective to cause the automatic control device 12 to become operative to take over automatic operation of the train to proceed without waiting any lengthy period of time for the brake pipe to become fully recharged, which might be the case if the train is very lengthy or leakage is high.

Once the brake pipe begins to recharge after the aforesaid service reduction, the lever arm 37 again moves upward to disengage the contact buttons 68 and 52 to extinguish the dial indicating light 9, however, holding circuits (not shown) maintain the automatic controls effective. The continued upward movement of the lever arm 37 causes the contact arm 48 to engage the adjusting screw 70 on the follower arm 59 to rotate the switch assembly about the bolt 57 towards its normal position (as shown) when the brake pipe is completely recharged, thereby readying the flow indicator for future operation.

The gap between the contact buttons 68 and 52 can be regulated by adjustment of either the engaging screw 42 or the adjusting screw 70 to thereby regulate the timing of the energizing of the described circuitry after the service reduction to thereby regulate the timing of take-over of the automatic controls.

Having now described the invention, what I claim as new and desire to secure by Letters Patent, is:

1. For use in an automated train operatiing equipment, the combination of:
    (a) means for conditioning the train equipment for operation,
    (b) a normally charged brake pipe extending throughout the train, reductions of pressure therein effecting brake operations,
    (c) brake valve means on the head end of the train for effecting supply and release of fluid under pressure to and from said brake pipe, to respectively effect charging of said brake pipe and initiation of brake applications,
    (d) an integrity signaling device on the rear of the train operative responsively to attainment of a predetermined pressure in said brake pipe responsive to charging of the brake pipe by said brake valve means after a first brake pipe pressure reduction by said brake valve means, for initiating a second brake pipe pressure reduction in the brake pipe from the rear end of the train,
    (e) flowmeter means for continuously registering the rate of charging flow of fluid to the brake pipe, and
    (f) switch means operative responsively to registration by said flowmeter means of increasing rate of flow of fluid to the brake pipe incidental to said second brake pipe pressure reduction to complete circuitry for causing said conditioning means to render the train equipment operative to initiate propulsion of the train.

2. For use in an automated train operating equipment, the combination of:
    (a) means for conditioning the train equipment for operation,
    (b) a normally charged brake pipe extending throughout the train, reductions of pressure therein effecting brake operations,
    (c) brake valve means on the head end of the train for effecting supply and release of fluid under pressure to and from said brake pipe, to respectively effect charging of said brake pipe and initiation of brake applications,
    (d) integrity signaling device on the rear of the train operative responsively to attainment of a predetermined pressure in said brake pipe means responsive to charging of the brake pipe by said brake valve means after a first brake pipe pressure reduction by said brake valve means for initiating a second brake pipe pressure reduction in the brake pipe from the rear end of the train,
    (e) fluid pressure supply means including a source of fluid under pressure and a supply pipe therefrom to said brake valve means,
    (f) choke means in said supply means across which a fluid pressure differential is effected between the pressure of fluid from said source and the pressure of fluid delivered to said brake pipe while said brake pipe is being charged,
    (g) flowmeter means connected across said choke means to measure said fluid pressure differential to cause a continuous registration of the rate of charging flow of fluid to the brake pipe corresponding to the fluid pressure differential, and
    (h) switch means operative responsively to registration by said flowmeter means of increasing rate of flow of fluid to the brake pipe incidental to said second brake pipe pressure reduction to complete circuitry for causing said conditioning means to render the train equipment operative to initiate propulsion of the train.

No references cited.

EUGENE G. BOTZ, *Primary Examiner.*